United States Patent
Burd (10) Patent No.: US 7,155,660 B1
(45) Date of Patent: Dec. 26, 2006

(54) DETECTION IN THE PRESENCE OF MEDIA NOISE

(75) Inventor: Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 588 days.

(21) Appl. No.: 10/698,660

(22) Filed: Oct. 31, 2003

Related U.S. Application Data (63) Continuation-in-part of application No. 10/208,312, filed on Jul. 29, 2002, now Pat. No. 6,931,585.

(60) Provisional application No. 60/345,725, filed on Jan. 3, 2002.

(51) Int. Cl.
*H03M 13/03* (2006.01)

(52) U.S. Cl. ............. 714/795; 714/794; 375/341

(58) Field of Classification Search ........... 714/794, 714/795, 796; 375/262, 341
See application file for complete search history.

(56) References Cited

U.S. PATENT DOCUMENTS

| | | | | |
|---|---|---|---|---|
| 5,521,945 | A | * | 5/1996 | Knudson ............... 375/341 |
| 5,588,011 | A | * | 12/1996 | Riggle ............... 714/792 |
| 5,606,464 | A | | 2/1997 | Agazzi et al. ......... 360/46 |
| 5,689,532 | A | * | 11/1997 | Fitzpatrick ........... 375/341 |
| 5,889,823 | A | | 3/1999 | Agazzi et al. ......... 375/341 |
| 6,185,175 | B1 | | 2/2001 | Zook ................. 369/53.35 |
| 6,201,839 | B1 | | 3/2001 | Kavcic et al. ......... 375/341 |
| 6,246,723 | B1 | | 6/2001 | Bliss et al. ........... 375/265 |
| 6,317,419 | B1 | | 11/2001 | Olafsson et al. ........ 714/795 |
| 6,347,391 | B1 | | 2/2002 | Uesugi et al. .......... 714/795 |
| 6,438,180 | B1 | | 8/2002 | Kavcic et al. ......... 375/341 |
| 6,735,724 | B1 | * | 5/2004 | McClellan ............. 714/704 |

OTHER PUBLICATIONS

Aleksandar Kavcic/Jose F. Moura, "The Viterbi Algorithm and Markov Noise Memory", IEEE Transactions on Information Theory, vol. 46, No. 1, Jan. 2000, pp. 291-301.

Runsheng He/Nersi Nazari, "An Analytical Approach to Performance Evaluation of Partial Response Systems in the Presence of Signal-Dependent Medium Noise", 5 pages.

\* cited by examiner

*Primary Examiner*—Guy Lamarre
*Assistant Examiner*—Esaw Abraham (57) ABSTRACT

A signal detector to detect data in an input signal. The signal detector includes a finite impulse response (FIR) filter to equalize the data to a first target length. A Viterbi-like detector is matched to a primary target and generates a most likely path corresponding to the data in the input signal. A linear post-processor determines at least one most likely error event in the most likely path and generates revised paths based on the at least one most likely error event. A media noise processor operates on the data with a secondary target that is different than the primary target. The media noise processor computes path metrics corresponding to each of the revised paths as a function of a non-linear noise model and selects one of the revised paths based on the path metrics.

124 Claims, 8 Drawing Sheets

DETECTION IN THE PRESENCE OF MEDIA NOISE

CROSS-REFERENCE TO RELATED APPLICATIONS

This application is a continuation-in-part of U.S. non-provisional application Ser. No. 10/208,312, filed Jul. 29, 2002, now U.S. Pat. No. 6,931,585 which claims the benefit of the filing date of U.S. provisional application No. 60/345,725 filed Jan. 3, 2002, the contents of which are herein incorporated by reference in its entirety.

TECHNICAL FIELD

An aspect of this invention relates to decoding a communication signal in the presence of noise.

BACKGROUND

With the continuing evolution of computer systems, there is an increasing demand for greater storage density. But, as storage density increases, problems associated with signal dependent noise and interference increase. To detect data in the presence of signal dependent noise, detectors typically employ complex schemes such as modifying the Euclidean branch metric to compensate for the noise and adaptively computing channel statistics. Other detectors have used a post-processor based on a model of the channel.

SUMMARY

A signal detector to detect data in an input signal. The signal detector includes a finite impulse response (FIR) filter to equalize the data to a primary target. A Viterbi-like detector is matched to the primary target and generates a most likely path corresponding to the data in the input signal. A linear post-processor determines at least one most likely error event in the most likely path and generates revised paths based on the at least one most likely error event. A media noise processor operates on the data with a secondary target that is different from the primary target. The media noise processor computes path metrics corresponding to each of the revised paths as a function of a non-linear noise model and selects one of the revised paths based on the path metrics.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
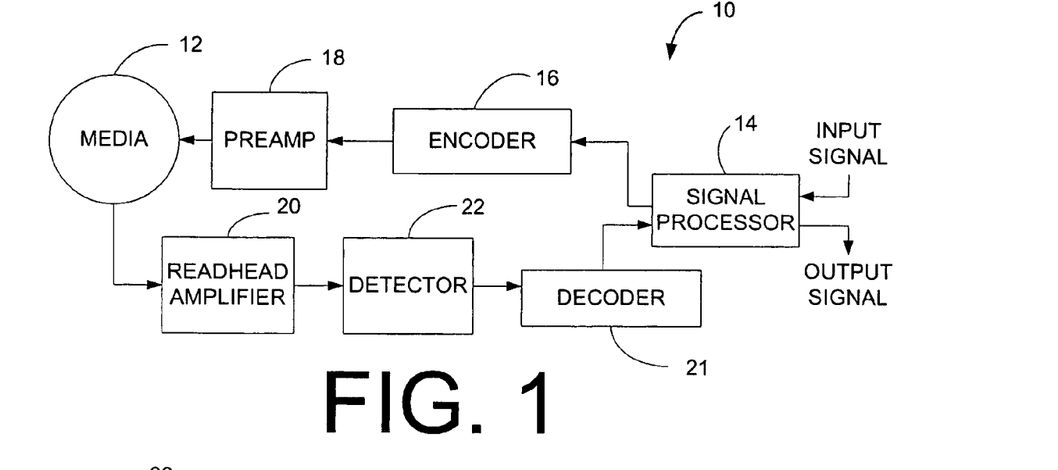
FIG. 1 illustrates a recording assembly for storing data.

FIG. 1 shows a recording assembly 10 for storing data. The recording assembly 10 includes media 12 to which data may be written and read. The media 12 may be included in any known storage device such as hard drives and optical disks. In a writing operation, a signal processor 14 may apply compression and error correction schemes to an input signal. An encoder 16 converts the processed input signal to a format suitable for storage by the storage unit 12. A preamp 18 amplifies and writes the encoded signal to the media 12. In a reading operation, a read head amplifier 20 detects and generates the read back signal by reading data from the media 12. The read head amplifier 20 may include a read equalizer for equalizing the data. A detector 22 detects symbols in the read back signal. The detector 22 is particularly suitable for signal detection in the presence of signal dependent noise. Although the detector 22 is described in conjunction with a recording system, the detector may be used for signal detection over any type of communication channel. A decoder 21 may decompress the decoded signal. The signal processor 14 may apply error correction to the decompressed signal to generate an output signal representing the recovered data.

Figure 2:
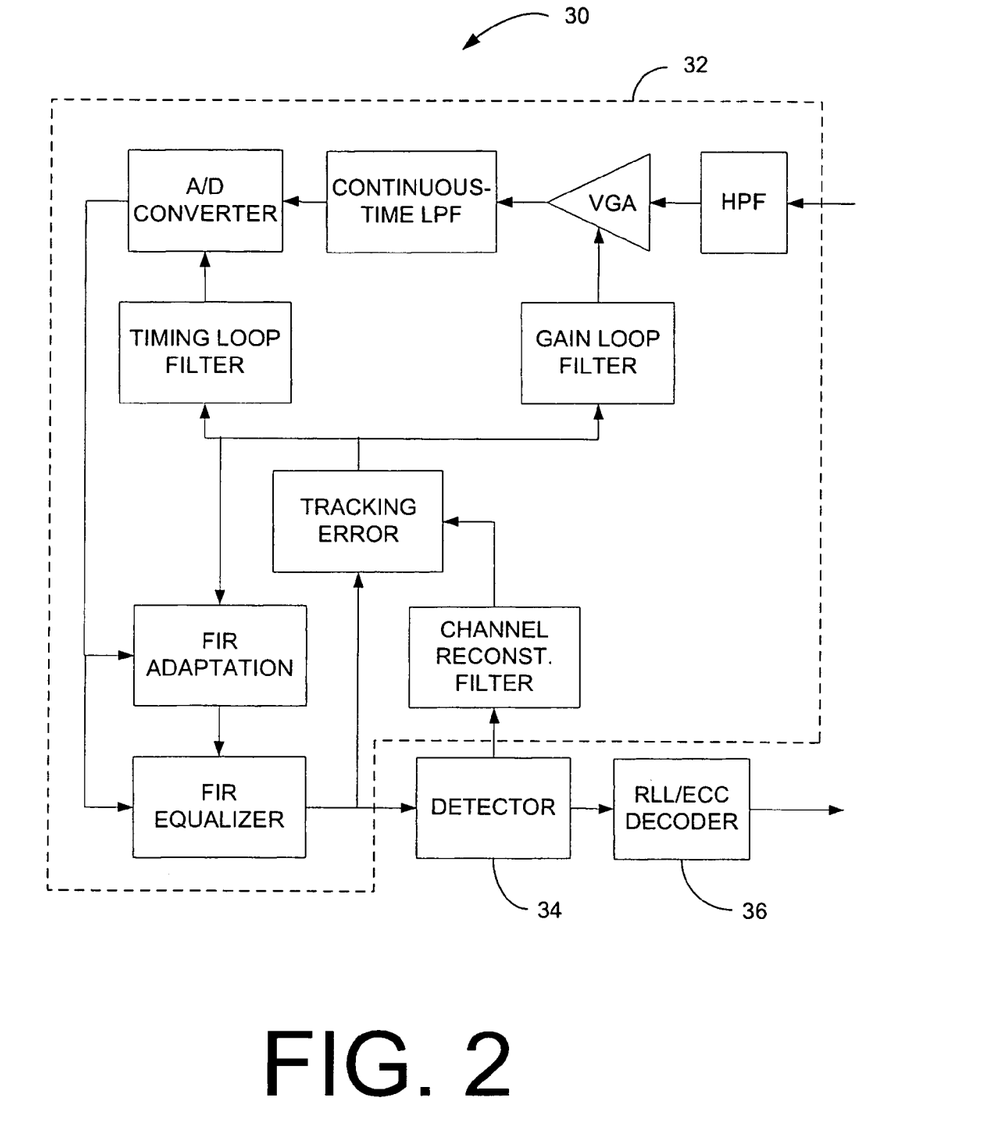
FIG. 2 shows a receiver for receiving a communication signal.

FIG. 2 shows a receiver 30 for decoding a communication signal that may include signal dependent noise. A signal processor 32 filters and equalizes the communication signal. The data in the filtered communication signal may be detected by a signal detector 34 in accordance with the teachings of the invention. The signal detector 34 is not limited to being implemented in the illustrated receiver 30, instead the signal detector may be included in any appropriate receiver. An RLL/ECC decoder 36 may then decode the detected data.

Figure 3:
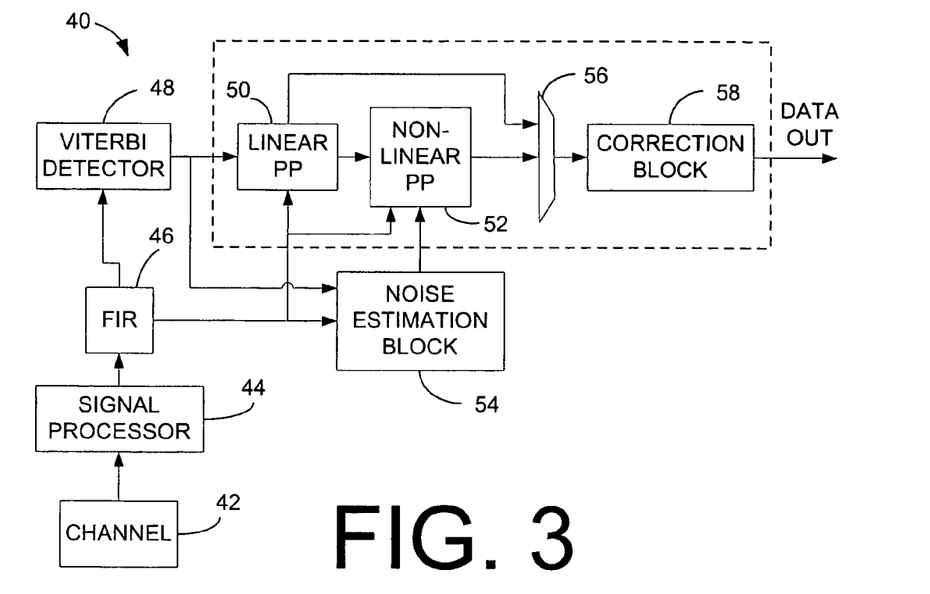
FIG. 3 is a block diagram of an aspect of a communication signal detector.

FIG. 3 shows an aspect of a non-linear signal detector 40 for detecting data in a communication signal. The non-linear signal detector 40 may detect data in the presence of media noise such as inter-symbol interference and other pattern dependent noise. A channel 42 communicates a stream of data to the non-linear signal detector 40. A signal processor 44 may filter and equalize the stream of data. A finite impulse response (FIR) filter 46 filters the stream of data. A Viterbi-like detector 48 may detect data in the stream of data and generate soft or hard decisions. Any Viterbi-like detector 48 that is derived under the assumption of additive white Gaussian noise (AWGN) may be employed such as partial response maximum likelihood (PRML) schemes or hybrids between tree/trellis detectors and decision feedback equalizers (DFE) including Fixed Delay Tree Search with Decision Feedback (FDTS/DF), and multilevel decision feedback (MDFE). A linear post-processor 50 filters the Viterbi decisions for dominant error events by identifying the least reliable Viterbi decisions. A list of the typical dominant error events may be used to identify the least reliable Viterbi decisions. The typical dominant error event list may include dominant error events such as {+}, {+−}, {+−+}, {+−+−}, and {+−+−+}. For each block of length C, the linear post-processor 50 may identify a list of N least reliable Viterbi decisions. The list of least reliable decisions may include decision information such as error location, error type, and polarity. The linear post-processor 50 may evaluate a metric such as a linear maximum likelihood distance penalty (MLDP) associated with an error event to identify the least reliable Viterbi decisions. The most likely error events may be determined based on the list of typical dominant error events and a computed path metric. Preferably, two most likely error events are determined. However, any number of error events may be selected ranging from at least one. In addition, the number of error events selected may be varied based on factors such as block length C and the frequency of low reliability decisions. Revised paths corresponding to each of the least reliable decisions may be generated based on the most likely error events.

The non-linear MLDP may be derived from a non-linear noise model of the communications channel output. A non-linear post-processor 52 may determine a non-linear MLDP for each of the revised paths. The lower the value of the non-linear MLDP ($MLDP_{nlin}$), the more likely the corresponding path is the best path. The non-linear MLDP may be a function of a non-linear path metric that includes a representation of data dependent channel noise.

$$MLDP_{nlin}(\text{error}) = PM_{nlin}(\text{viterbi\_out} + \text{error}) - PM_{nlin}(\text{viterbi\_out}) =$$
$$\sum_{\text{Branches}} (BM_{nlin}(\text{viterbi\_out} + \text{error}) - BM_{nlin}(\text{viterbi\_out}))$$

A noise estimation block 54 may estimate the noise characteristics by using a non-linear channel model such as that described below in Equation BM, where x(D) represents the input bits to a channel and y(D) represents the output values of the channel.

$$y_t = \bar{y}_t + m_t(x(D)) + n_t(x(D))$$

where;

$$\bar{y}_t = \sum_{k=0}^{I} x_{t-k} \cdot h_k, \quad m_t(x(D))$$

represents data dependent mean shift, $n_t(x(D))$ is modeled as signal dependent Gauss-Markov noise process with memory length L, and $h_k$ represents a primary equalization target.

$$n_t(x(D)) = \sum_{k=1}^{L} f_k(x(D))n_{t-k} + \sigma_t(x(D))N(0,1),$$

To simplify, it is further assumed that;

$$m_t(x(D)) = m_t(x_{t-I} \ldots, x_{t-2}, x_{t-1}, x_t)$$

$$\sigma_t(x(D)) = \sigma(x_{t-I} \ldots, x_{t-2}, x_{t-1}, x_t)$$

$$f_k(x(D)) = f_k(x_{t-I} \ldots, x_{t-2}, x_{t-1}, x_t), \text{ for } k=1,\ldots, L$$

The corresponding non-linear Viterbi Branch Metric (BM) is given by:

$$BM = \ln(\sigma_t^2(x(D))) + \left(y_t - (\bar{y}_t + m_t)\sum_{k=1}^{L} f_k(x(D))n_{t-k}\right)^2 \left(\frac{1}{\sigma_t^2(x(D))}\right)$$

$$BM = \ln(\sigma_t^2(x(D))) + \left(n_t - \sum_{k=1}^{L} f_k(x(D))n_{t-k}\right)^2 \left(\frac{1}{\sigma_t^2(x(D))}\right)$$

$$BM = \ln(\sigma_t^2(x(D))) + \left(\sum_{k=0}^{L} \hat{f}_k(x(D))n_{t-k}\right)^2$$

Eq. BM where;

$$\hat{f}_0 = \frac{1}{\sigma(x(D))}, \hat{f}_1 = -f_1 \cdot \frac{1}{\sigma(x(D))}, \ldots \hat{f}_3 = -f_3 \cdot \frac{1}{\sigma(x(D))}$$

A selector 56 selects the revised path that represents the most likely path based upon the path metrics such as the non-linear MLDP computed for each of the most likely error events associated with a least reliable Viterbi decision. The most likely path is the revised path having the lowest non-linear path metric. The selection of the most likely path may also be a function of other path information such as parity error status.

A correction block 58 revises the Viterbi decision to correspond to the selected most likely path and inserts the revised Viterbi decision into the output data stream.

Figure 4:
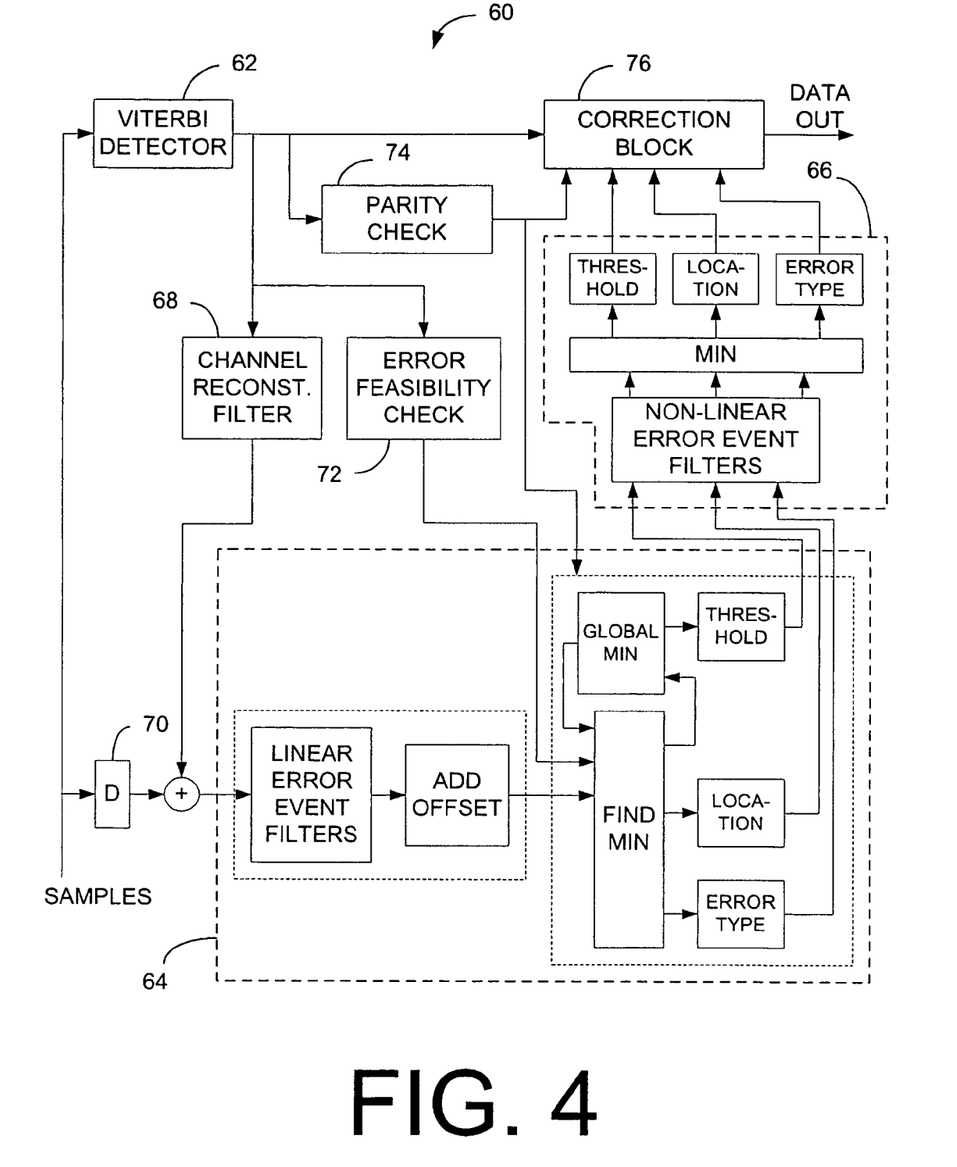
FIG. 4 is a block diagram of an aspect of a communication signal detector.

FIG. 4 shows another aspect of a non-linear signal detector 60 for detecting data in a communication signal. The non-linear signal detector 60 is similar in function to the non-linear signal detector 40 and including a Viterbi detector 62 to detect symbols in a data stream and generate decisions. A linear post-processor 64 and a non-linear post-processor 66 operate similarly to the linear post-processor 50 and non-linear post-processor 52. A channel reconstruction filter 68 may filter the Viterbi decisions to generate noiseless samples. The outputs of the delay 70 and channel reconstruction filter 68 may be subtracted to determine linear noise/error samples which are input to the linear post-processor 64. An error feasibility check block 72 may evaluate the Viterbi decisions and linear post-processor outputs to determine whether an error might exist in the Viterbi decisions for a codeword. A parity block 74 determines the parity status, violation or no violation, of codewords of the Viterbi decisions. A correction block 76 may evaluate the parity status, then determine whether to select one of the revised paths or pass the Viterbi decisions for the codeword through without corrections. For example, the threshold for the MLDP value at which a codeword will be corrected may be adjusted as a function of the parity status so that when a parity violation is indicated, the Viterbi decisions may be corrected even though the computed MLDPs do not strongly indicate a most likely path. Alternately, when a parity violation is not indicated, the Viterbi decisions for the codeword will not be corrected unless the computed MLDPs very strongly indicate a most likely path.

Figure 5:
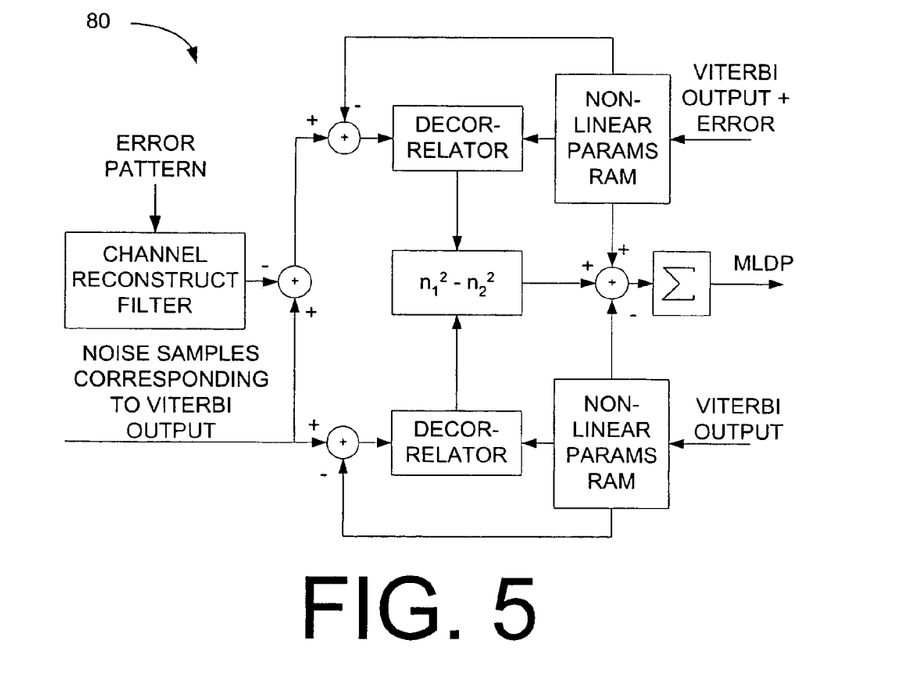
FIG. 5 is a block diagram of an aspect of an error event filter.

FIG. 5 shows a block diagram of an aspect of a non-linear error event filter 80. The non-linear error event filter 80 may compute an $MLDP_{nlin}$ based on the non-linear path metric described in Equation BM. The $MLDP_{nlin}$ may be described by the following equation.

$$MLDP_{nlin}(\text{error}) = PM_{nlin}(\text{viterbi\_out} + \text{error}) - PM_{nlin}(\text{viterbi\_out})$$

Eq. 1

Figure 6:
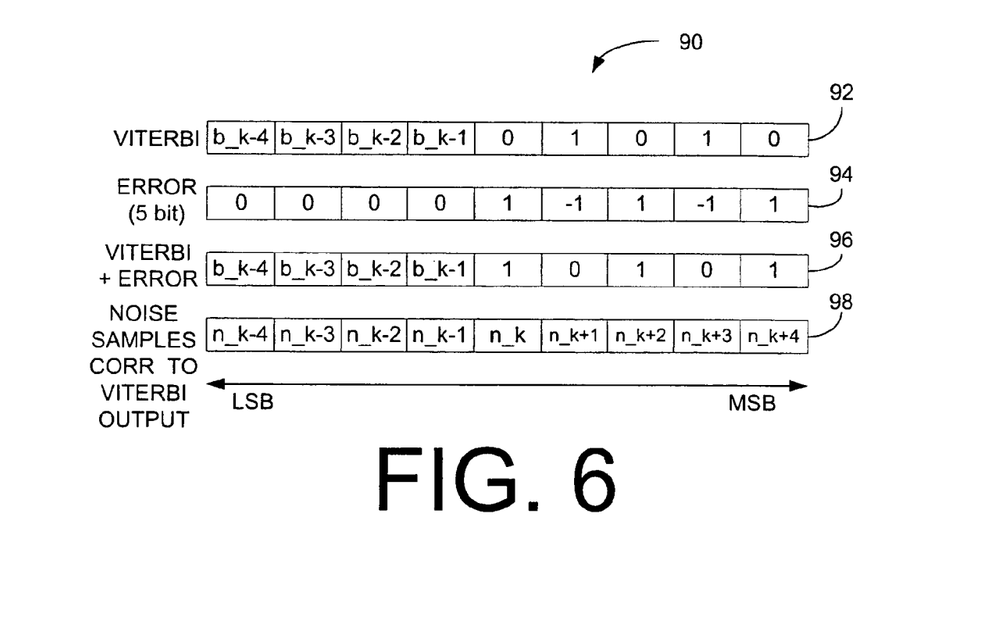
FIG. 6 is an error event processing diagram of a block of code.

FIG. 6 shows an error event processing diagram 90 of a block of code that may be processed by the non-linear error event filter 80. The error event processing diagram 90 illustrates the interrelationship between a Viterbi output 92, a 5-bit error 94, a resulting Viterbi+error 96, and a noise sample 98 corresponding to the Viterbi output 92.

Figure 7:
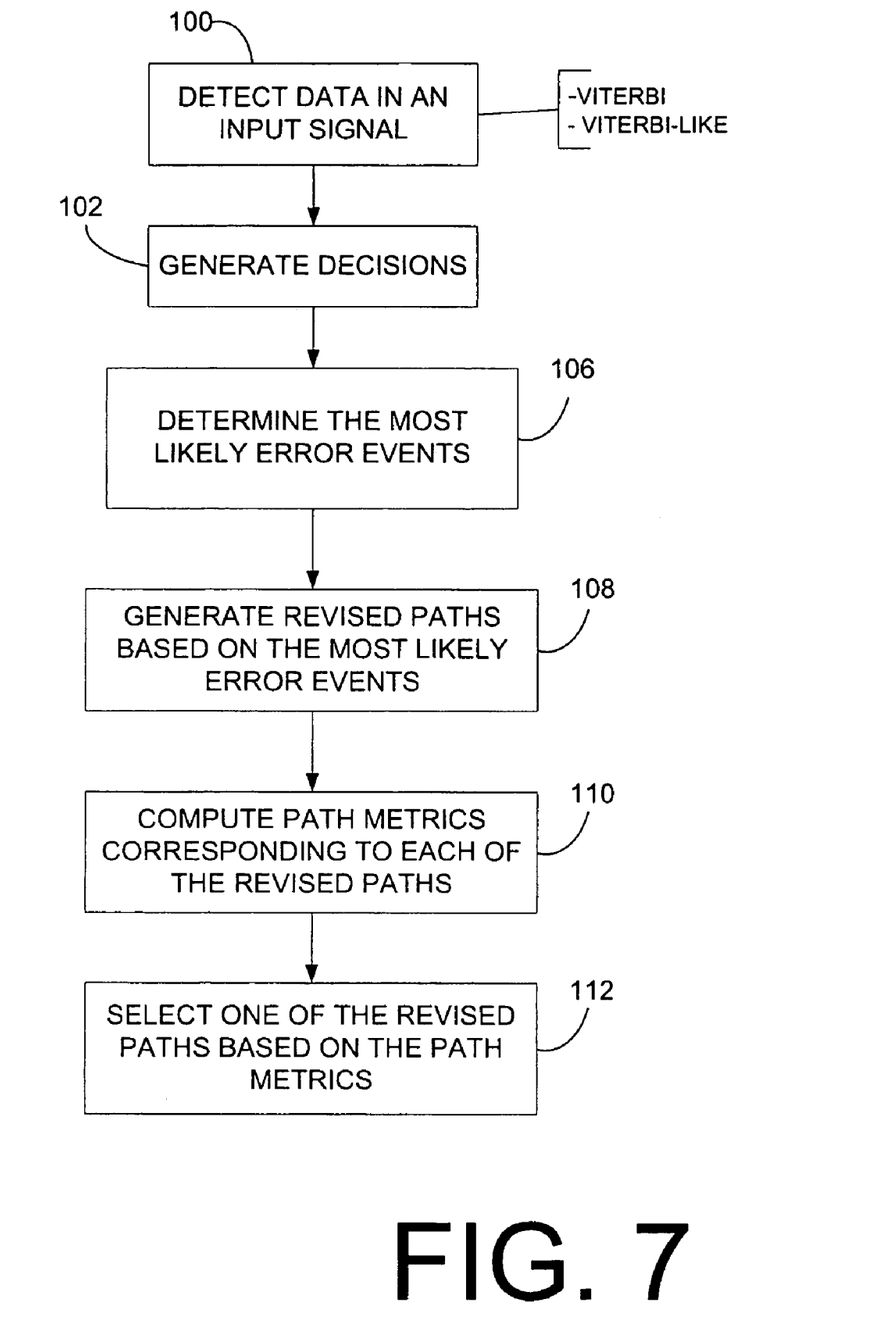
FIG. 7 is a flow diagram of a process for detecting data in a communication signal.

FIG. 7 shows a flow diagram of a process for detecting data in a communication signal. Starting at block 100, data in an input signal is detected by a Viterbi-like detector. Decisions, hard or soft, based on the detected data are generated at block 102. At block 106, the most likely error events are determined. Continuing to block 108, revised paths are generated based on the most likely error events. At block 110, path metrics corresponding to each of the revised paths are computed. The path metrics may be used to compute an MLDP corresponding to each of the revised paths. At block 112, one of the revised paths is selected based on the path metrics.

Figure 8:
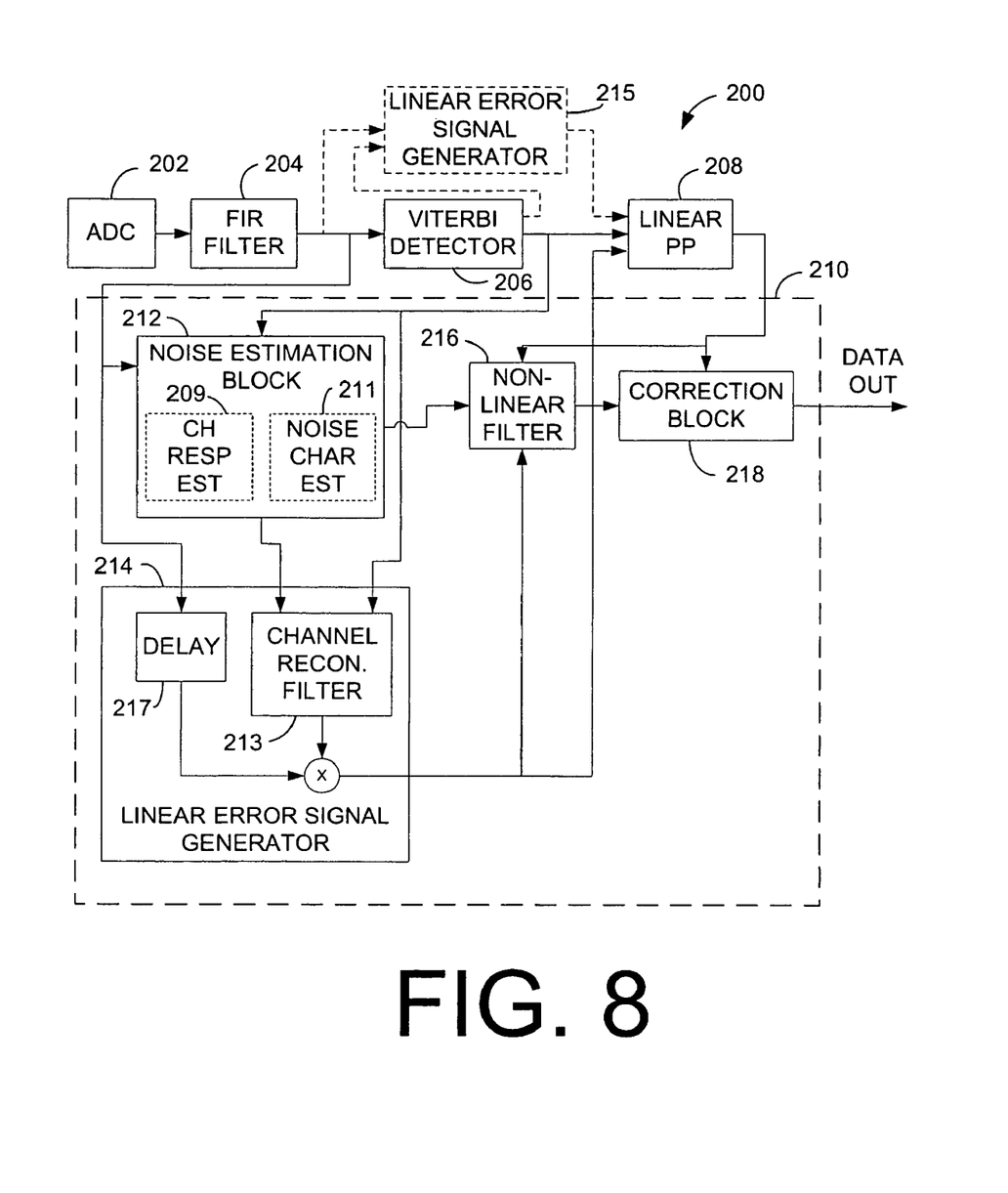
FIG. 8 is a block diagram of an aspect of a communication signal detector.

FIG. 8 shows a nonlinear signal detector 200 for detecting data in a communication signal. The nonlinear signal detector 200 may detect data in the presence of noise such as intersymbol interference (ISI) and other pattern dependent noise. An analog-to-digital converter (ADC) 202 may process an analog stream of data into a digital stream of data. A FIR filter 204 filters the stream of data. The FIR filter may equalize the data to a primary target. In one aspect the primary target may be a 5 tap target. A Viterbi-like detector 206 may detect data in the stream of data and generate hard or soft decisions. The Viterbi-like detector 206 may be matched to the primary target. The complexity of the Viterbi-like detector may be decreased by limiting the target length. In one example, where the FIR filter 204 may equalize to a 5 tap target, the Viterbi-like detector 206 may be matched to the 5 tap target length. Any type of Viterbi-like detector that is derived under the assumption of AWGN may be employed such as PRML schemes, hybrids between tree/trellis detectors, DFEs including FDTS/DF, and multi-level decision feedback.

A linear post-processor 208 may filter the Viterbi decisions for likely error events by identifying the least reliable Viterbi decisions. The linear post-processor 208 may function in a manner similar to the linear post-processor 50 described above and shown in FIG. 3. The linear post-processor 208 may be matched to either the primary target or a secondary target that may be a different target than that of the Viterbi detector 206.

A media noise processor 210 may compute path metrics for one or more of the revised paths determined by the linear post-processor 208. Then, the media noise processor may select one or more of the revised paths based on the computed path metrics. The path metrics may be computed as a function of a non-linear noise model that may model noise associated with the media on which the data is stored and communicated over. Any type of non-linear noise model may be employed. In one aspect, the non-linear noise model may include a channel response estimator 209 to estimate the channel response and a noise characteristics estimator 211 to estimate the noise characteristics. In another aspect, the media noise processor 210 may determine a non-linear MLDP as in Eq. 1. The lower the value of the non-linear MLDP, the more likely the corresponding path is the best path. The non-linear MLDP may be a function of a non-linear path metric that includes a representation of data dependent channel noise. The media noise processor 210 advantageously may use a different target (secondary target) than the target to which the Viterbi-like detector 206 is matched (primary target). The secondary target and primary target may differ in any parameter such as target length, tap values, and the number of taps. In one aspect, the secondary target of the media noise processor 210 may be longer than the primary target, which may lead to an increase in the accuracy of the path metrics that the media noise processor 210 computes. Although an increased target length may lead to an increase in the complexity of the media noise processor 210, the complexity only increases at a linear rate with increasing target length. For the Viterbi on the other hand, the complexity grows exponentially with increasing target length. By using a secondary target for the media noise processor 210 the accuracy of the computed path metrics may be increased, with only a minimal increase in the complexity of the media noise processor 210 and the linear post-processor 208, and no increase in the complexity of the Viterbi.

The secondary target used by the media noise processor 210 and possibly the linear post processor 208 is not known apriori and hence needs to be estimated. Until the secondary target estimates are available, the linear post-processor 208 and media noise processor 210 may operate with the primary target.

A noise estimation block 212 may receive the data from the FIR filter 204 and the Viterbi-like detector 206, and estimate an equalized channel response and media noise characteristics. For example, the channel noise may be estimated based on a non-linear channel model such as that described above in equation BM, although any non-linear channel model may be employed. The noise estimation block 212 may also estimate non-linear parameters such as mean shifts, noise whitening filtering (NWF), and residual noise variance. The noise estimation block 212 may track the secondary target. The secondary target response is initialized and aligned with the primary target of the Viterbi-like detector 206. In one aspect, a least mean square engine may be used to adapt the secondary target response, although any type of adaptive procedure may be used to adapt the secondary target response.

Figure 11:
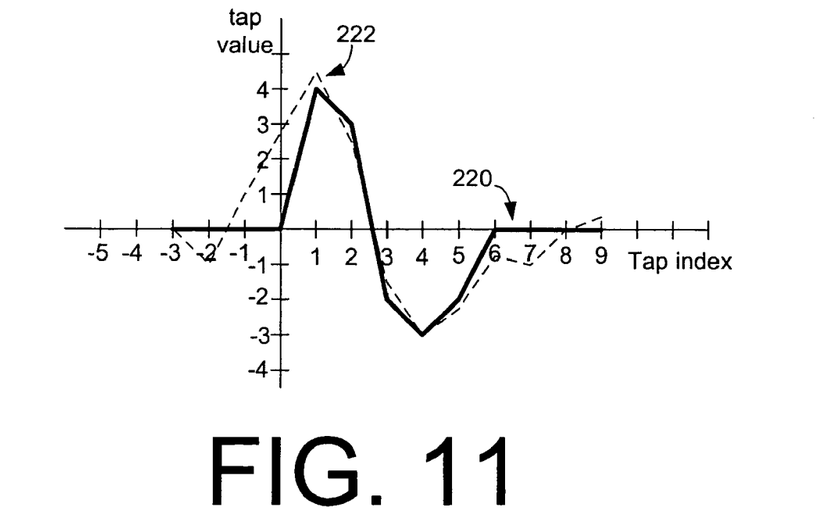
FIG. 11 is a graphical representation of primary and secondary targets.

FIG. 11 shows a graphical representation of an exemplary primary target 220 and a secondary target 222 adapted from the output of the FIR filter 204. The secondary target 222 is similar to the primary target 220 and is not limited to a response that has the same or fewer taps as the primary target 220, such as zero outside of the five taps in this example. Also, the taps of the secondary target are not limited to being integer valued, and therefore may have improved resolution and less mis-equalization.

A linear error signal generator 214 may compute the linear error. The linear error signal generator 214 may include a channel reconstruction filter 213 to convolve the output of the Viterbi-like detector 206 with the secondary target taps from the noise estimation block 212. A delay 217 may delay the output from the FIR filter 204. The linear error signal may subtract the the ouput of the channel reconstruction filter 213 from the output of the FIR filter 204. The linear error signal generator 214 may communicate the linear error to the linear post-processor 208 and a nonlinear filter 216. The linear error generated by the linear error signal generator 214 is based on the secondary target.

In another aspect, another linear error signal generator 215 may compute a linear error by subtracting the output of the Viterbi-like detector 206 from the output of the FIR filter 204. The linear error signal generator 215 may include a channel reconstruction filter, delay, and subtracter configured similarly to the linear error signal generator 214. The linear error signal generator 215 may communicate the linear error to the linear post-processor 208. The linear error computed by the linear error signal generator 215 is based on the primary target. In this aspect, the computed linear error of the linear error signal generator 214 is preferably only communicated to the nonlinear filter 216.

The nonlinear filter 216 may compute the non-linear Viterbi Branch Metrics corresponding to each of the revised paths that are determined by the linear post-processor 208.

A correction block 218 may select the revised path that represents the most likely path based upon the path metrics computed by the non-linear filter for each of the most likely error events associated with a least reliable Viterbi decision. The most likely path may be the revised path having the lowest non-linear path metric. The selection of the most likely path may also be a function of other path information such as parity error status. The correction block 218 may revise the decision of the Viterbi-like detector 206 to correspond to the selected most likely path and insert the revised Viterbi decision into the output data stream.

Figure 9:
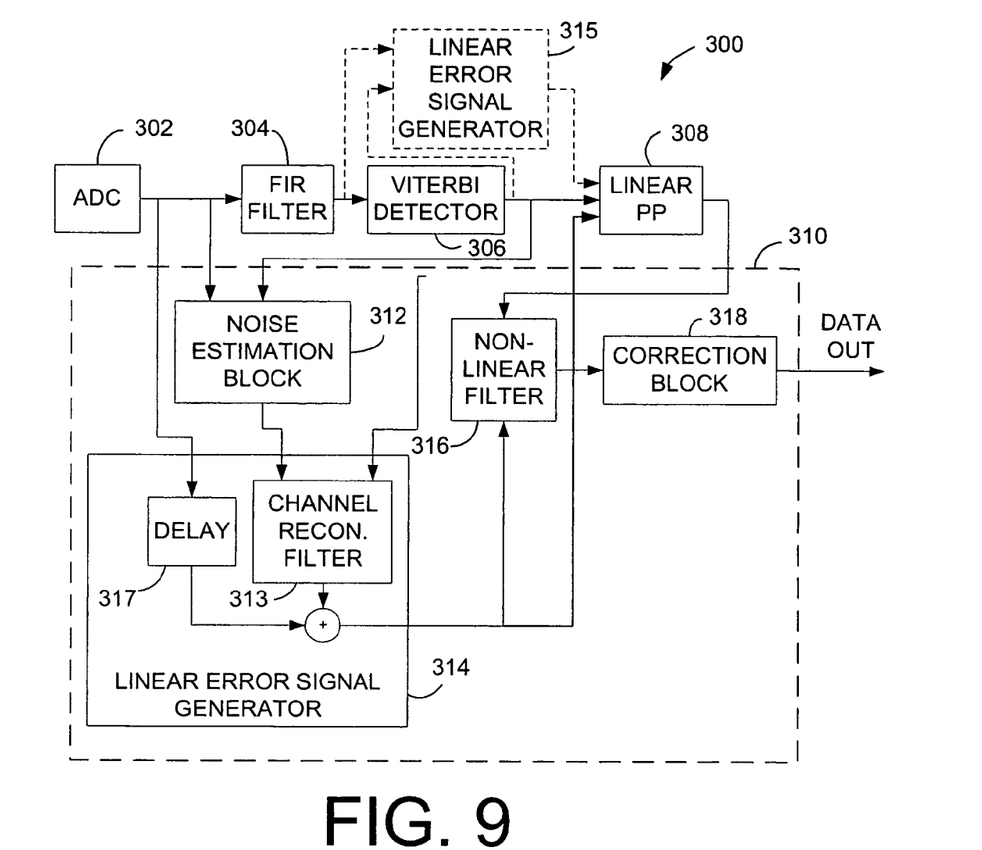
FIG. 9 is a block diagram of an aspect of a communication signal detector.

FIG. 9 shows another nonlinear signal detector 300 similar in function to nonlinear signal detector 200 and with corresponding elements in the range 300–320, except that in nonlinear signal detector 300 the media noise processor 310 operates on data that has not been filtered by the FIR filter 304. By operating on data prior to filtering by the FIR filter 304, the nonlinear signal detector 300 minimizes media noise characteristics degradation caused by the FIR filter 304 that may degrade the computation of the branch metrics. The estimated channel response following the ADC 202 is likely to be longer than the response following the FIR filter 204, since the response following the FIR filter 204 is usually limited in size to reduce the complexity of the Viterbi-like detector 206. The delay 317 may be set based on the channel implementation, for example the delay 317 may be longer than the delay 217.

Figure 10:
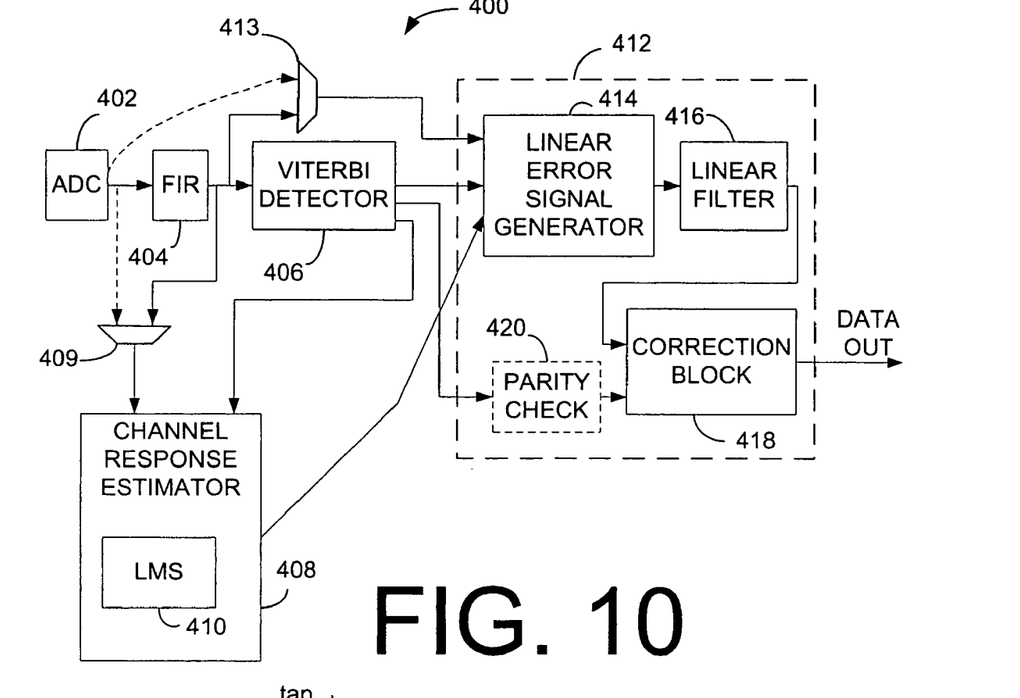
FIG. 10 is a block diagram of an aspect of a communication signal detector.

FIG. 10 shows a linear signal detector 400 for detecting data in a communication signal. An analog-to-digital converter (ADC) 402 may process an analog stream of data into a digital stream of data. A FIR filter 404 may filter the stream of data. The FIR filter 404 may equalize the data to a primary target such as a 5 tap target length. A Viterbi-like detector 406 may detect data in the stream of data and generate hard or soft decisions. The Viterbi-like detector 406 may be matched to the primary target. The complexity of the Viterbi-like detector 406 may be decreased by limiting the primary target length. In one example, where the FIR filter 404 may equalize to a 5 tap target and the Viterbi-like detector 406 may be matched to the 5 tap target. Any type of Viterbi-like detector that is derived under the assumption of AWGN may be employed such as PRML schemes, hybrids between tree/trellis detectors, DFEs including FDTS/DF, and multilevel decision feedback.

In one aspect, a channel response estimator 408 may advantageously track a secondary target that is different than the primary target. The secondary target may differ from the primary target in any parameter such as target length, the value of the target taps, and the quantity of target taps. In one aspect, the secondary target may be selected to be longer than the primary target. The data to the channel response estimator 408 may be communicated from the output of the FIR filter 404. The secondary target response is initialized and aligned with the target response of the Viterbi-like detector 406. The channel response estimator 408 may include a least mean square engine 410 to adapt the secondary target. In another aspect, the data may also be communicated from the ADC 402. Also, a multiplexer 409 may be employed to select between the output of the FIR filter 404 and the output of the ADC 402.

A linear post-processor 412 may filter the Viterbi decisions for dominant error events by identifying the least reliable Viterbi decisions. The linear post-processor 412 may advantageously be matched to either the secondary target or the primary target. For example, if a secondary target is used that is longer than the primary target, mis-equalization may be reduced. Although the increased target length of the secondary target may lead to an increase in the complexity of the linear post-processor 412, the complexity only increases at a linear rate with increasing target length. For the Viterbi-like detector 406 on the other hand, the complexity grows exponentially with increasing target length. By using a longer target length for the linear post-processor 412 than the target length used for the Viterbi detector 406, the accuracy of the computed path metrics may be increased, with only a minimal increase in the complexity of the linear post-processor 412 and no increase in the complexity of the Viterbi 406. In one aspect, either only the output from the ADC 402 or only the output from the FIR filter 404 may be communicated to the linear post-processor 412. In another aspect, a multiplexer 413 may be used to select one of the output from the ADC 402 or the output from the FIR filter 404. The multiplexer 413 and the multiplexer 409 preferably select each select the same output from either the FIR filter 404 or the ADC 402.

A linear error signal generator 414 may compute a linear error. The linear error signal generator 414 may include a channel reconstruction filter to shape the output of the Viterbi-like detector 406. Either the output of the ADC 402 or the output of the FIR filter 404 may be delayed and then subtracted from the output of the channel reconstruction filter to generate the linear error. The source of the data to the linear error signal generator 414 is preferably the same as the source of data for the channel response estimator 408.

A linear filter 416 may filter the Viterbi decisions for dominant error events by identifying the least reliable Viterbi decisions. A list of the typical dominant error events may be used to identify the least reliable Viterbi decisions. For each block of length C, the linear filter 416 may identify a list of N least reliable Viterbi decisions. The list of least reliable decisions may include decision information such as error location, error type, and polarity. The linear filter 416 may compute path metrics from the linear error for the corresponding Viterbi decisions to identify the least reliable Viterbi decisions. The most likely error events corresponding to each of the least reliable decisions may be determined based on the list of typical dominant error events and the computed path metric. Preferably, two most likely error events are determined. However, any number of error events may be selected ranging from at least one. In addition, the number of error events selected may be varied based on factors such as the frequency of low reliability decisions. Revised paths corresponding to each of the least reliable decisions may be generated based on the most likely error events A correction block 418 may select the revised path that represents the most likely path based upon the computed path metrics for each of the most likely error events corresponding to a least reliable Viterbi decision. The most likely path is the revised path having the lowest non-linear path metric. The selection of the most likely path may also be a function of other path information such as parity violation status. A parity check block 420 may determine the parity violation status. The correction block 218 may revise the decision of the Viterbi-like detector 206 to correspond to the selected most likely path and insert the revised Viterbi decision into the output data stream.

A number of aspects of the invention have been described. Nevertheless, it will be understood that various modifications may be made without departing from the spirit and scope of the invention. Accordingly, other embodiments are within the scope of the following claims.

What is claimed is:

1. A signal detector to detect data in an input signal, comprising:
    a finite impulse response (FIR) filter to equalize the data to a primary target;
    a Viterbi-like detector matched to the primary target and to generate a most likely path corresponding to the data in the input signal;
    a linear post-processor matched to one of the primary target and a secondary target, and to determine at least one most likely error event in the most likely path, the linear post-processor to generate revised paths based on the at least one most likely error event; and
    a media noise processor matched to the secondary target and to compute path metrics corresponding to each of the revised paths as a function of a non-linear noise model and to select one of the revised paths based on the path metrics, the secondary target having at least one parameter different than the first target.

2. The signal detector of claim 1 wherein the FIR filter to communicate the data to the media noise processor.

3. The signal detector of claim 1 further comprising an analog-to-digital converter (ADC) to communicate the data to the media noise processor.

4. The signal detector of claim 1 wherein the primary target has a target length and the secondary target has a target length that is greater than the target length of the primary target.

5. The signal detector of claim 1 wherein the media noise processor further comprises an estimation block to estimate an equalized channel response.

6. The signal detector of claim 5 wherein the estimation block to estimate non-linear parameters.

7. The signal detector of claim 6 wherein the non-linear parameters are selected from a group consisting of mean shifts, residual noise variance, and noise whitening filtering (NWF).

8. The signal detector of claim 5 wherein the estimation block to initialize a secondary target response with a primary target response of the Viterbi-like detector, and to include a least mean squares engine to adapt the secondary target.

9. The signal detector of claim 5 wherein the media noise processor further comprises a linear error signal generator to determine a linear error as a function of convolving an output of the Viterbi-like detector with secondary target taps from the estimation block.

10. The signal detector of claim 1 wherein the linear post-processor is matched to the secondary target.

11. The signal detector of claim 1 wherein the linear post-processor to generate revised paths that correspond to each of the at least one most likely error event.

12. The signal detector of claim 1 further comprising a correction block to correct the most likely path based on the selected one of the revised paths.

13. The signal detector of claim 12 wherein the correction block evaluates a parity condition of the most likely path and corrects the most likely path based on the selected one of the revised paths and the parity condition.

14. The signal detector of claim 13 wherein the parity condition has a parity violated state and a parity not violated state; and wherein a correction threshold is adjusted based on the parity condition such that the correction threshold is set higher for the parity not violated state.

15. The signal detector of claim 1 wherein the at least one parameter is selected from a group consisting of target length, value of target taps, and quantity of target taps.

16. The signal detector of claim 1 wherein the Viterbi-like detector is selected from a group consisting of Viterbi detectors, PRML detectors, tree/trellis detectors, decision feedback detectors and hybrid detectors.

17. The signal detector of claim 1 included in a receiver to decode a communication signal from a storage device.

18. The signal detector of claim 1 wherein the non-linear noise model is described by the following equation:

$$BM = \ln(\sigma_t^2(x(D))) + \left(\sum_{k=0}^{L} \hat{f}_k(x(D))n_{t-k}\right)^2$$

where BM is the non-linear branch metric, L is memory length, $$\hat{f}_0 = \frac{1}{\sigma(x(D))}, \hat{f}_1 = -f_1 \cdot \frac{1}{\sigma(x(D))}, \ldots \hat{f}_3 = -f_3 \cdot \frac{1}{\sigma(x(D))},$$

x(D) represents the input bits to a channel, and $$n_t(x(D)) = \sum_{k=1}^{L} f_k(x(D))n_{t-k} + \sigma_t(x(D))N(0, 1).$$

19. A signal detector to detect data in an input signal, comprising:
    a finite impulse response (FIR) filter to equalize the data to a primary target;
    a Viterbi-like detector matched to the primary target and to generate a most likely path corresponding to the data in the input signal;
    a channel response estimator to track a secondary target, the secondary target having at least one parameter different than the primary target; and
    a linear post-processor matched to one of the primary target and the secondary target and to determine at least one most likely error event in the most likely path, the linear post-processor to generate revised paths based on the at least one most likely error event, the linear post-processor to compute path metrics corresponding to each of the revised paths as a function of the most likely path and the linear response, and to select one of the revised paths based on the path metrics.

20. The signal detector of claim 19 wherein the FIR filter to communicate the data to the channel response estimator.

21. The signal detector of claim 19 further comprising an analog-to-digital converter (ADC) to communicate the data to the channel response estimator.

22. The signal detector of claim 19 wherein the channel response estimator to initialize a secondary target response with a primary target response of the Viterbi-like detector, and to include a least mean squares engine to adapt the secondary target.

23. The signal detector of claim 19 wherein the linear post-processor further comprises a linear error signal generator to determine a linear error as a function of convolving an output of the Viterbi-like detector with secondary target taps of the channel response estimator.

24. The signal detector of claim 19 wherein the linear post-processor generates revised paths that correspond to each of the at least one most likely error event.

25. The signal detector of claim 19 wherein the linear post-processor further comprises a correction block to correct the most likely path based on the selected one of the revised paths.

26. The signal detector of claim 25 wherein the correction block to evaluate a parity condition of the most likely path and to correct the most likely path based on the selected one of the revised paths and the parity condition.

27. The signal detector of claim 26 wherein the parity condition has a parity violated state and a parity not violated state; and
wherein a correction threshold is adjusted based on the parity condition such that the correction threshold is set higher for the parity not violated state.

28. The signal detector of claim 19 wherein the at least one parameter is selected from a group consisting of target length, value of target taps, and quantity of target taps.

29. The signal detector of claim 19 wherein the Viterbi-like detector is selected from a group consisting of Viterbi detectors, PRML detectors, tree/trellis detectors, decision feedback detectors and hybrid detectors.

30. The signal detector of claim 19 wherein the linear post-processor is matched to the secondary target; and
wherein the primary target has a target length and the secondary target has a target length that is greater than the target length of the primary target.

31. The signal detector of claim 19 included in a receiver to decode a communication signal from a storage device.

32. A signal detector to detect data in an input signal, comprising:
means for filtering to equalize the data to a primary target;
means for detecting matched to the primary target and to generate a most likely path corresponding to the data in the input signal;
means for post-processing matched to one of the primary target and a secondary target, and to determine at least one most likely error event in the most likely path, the means for post-processing to generate revised paths based on the at least one most likely error event; and
means for operating on the data being matched to the secondary target, the means for operating to compute path metrics corresponding to each of the revised paths as a function of a non-linear noise model and to select one of the revised paths based on the path metrics, the secondary target having at least one parameter different than the primary target.

33. The signal detector of claim 32 wherein the means for filtering to communicate the data to the means for operating.

34. The signal detector of claim 32 further comprising means for converting data to communicate the data to the means for operating.

35. The signal detector of claim 32 wherein the primary target has a target length and the secondary target has a target length that is greater than the target length of the primary target.

36. The signal detector of claim 32 wherein the means for operating further comprises means for estimating an equalized channel response.

37. The signal detector of claim 36 wherein the means for estimating to estimate non-linear parameters.

38. The signal detector of claim 37 wherein the non-linear parameters are selected from a group consisting of mean shifts, residual noise variance, and noise whitening filtering (NWF).

39. The signal detector of claim 36 wherein the means for estimating to initialize a secondary target response with a primary target response of the means for detecting, and to include a least mean square engine to adapt the secondary target.

40. The signal detector of claim 36 wherein the means for operating further comprises means for determining a linear error as a function of convolving an output of the means for detecting with secondary target taps from the means for estimating.

41. The signal detector of claim 32 wherein the means for post-processing is matched to the secondary target.

42. The signal detector of claim 32 wherein the means for post-processing to generate revised paths that correspond to each of the at least one most likely error event.

43. The signal detector of claim 32 further comprising means for correcting the most likely path based on the selected one of the revised paths.

44. The signal detector of claim 43 wherein the means for correcting to evaluate a parity condition of the most likely path and to correct the most likely path based on the selected one of the revised paths and the parity condition.

45. The signal detector of claim 44 wherein the parity condition has a parity violated state and a parity not violated state; and
wherein a correction threshold is adjusted based on the parity condition such that the correction threshold is set higher for the parity not violated state.

46. The signal detector of claim 32 wherein the at least one parameter is selected from a group consisting of target length, value of target taps, and quantity of target taps.

47. The signal detector of claim 32 wherein the means for detecting is selected from a group consisting of Viterbi detectors, PRML detectors, tree/trellis detectors, decision feedback detectors and hybrid detectors.

48. The signal detector of claim 32 included in a receiver to decode a communication signal from a storage device.

49. The signal detector of claim 32 wherein the non-linear noise model is described by the following equation:

$$BM = \ln(\sigma_t^2(x(D))) + \left(\sum_{k=0}^{L} \hat{f}_k(x(D))n_{t-k}\right)^2$$

where BM is the non-linear branch metric, L is memory length, $$\hat{f}_0 = \frac{1}{\sigma(x(D))}, \hat{f}_1 = -f_1 \cdot \frac{1}{\sigma(x(D))}, \ldots \hat{f}_3 = -f_3 \cdot \frac{1}{\sigma(x(D))},$$

represents the input bits to a channel, and $$n_t(x(D)) = \sum_{k=1}^{L} f_k(x(D))n_{t-k} + \sigma_t(x(D))N(0, 1).$$

50. A signal detector to detect data in an input signal, comprising:

means for filtering to equalize the data to a primary target;
means for detecting to generate a most likely path corresponding to the data in the input signal, the detecting means matched to the primary target;
means for estimating to track a secondary target, the secondary target having at least one parameter different than the primary target; and
means for post-processing matched to one of the primary target and the secondary target, to determine at least one most likely error event in the most likely path, and to generate revised paths based on the at least one most likely error event, the means for post-processing to compute path metrics corresponding to each of the revised paths as a function of the most likely path and the linear response, and to select one of the revised paths based on the path metrics.

51. The signal detector of claim 50 wherein the means for filtering to communicate the data to the channel response estimator.

52. The signal detector of claim 50 further comprising means for converting analog to digital to communicate the data to the channel response estimator.

53. The signal detector of claim 50 wherein the means for estimating to initialize a secondary target response with a primary target response of the detecting means and to include a least mean square engine to adapt the secondary target.

54. The signal detector of claim 50 wherein the means for post-processing further comprises means for signal generating to determine a linear error as a function of convolving an output of the means for detecting with secondary target taps of the means for estimating.

55. The signal detector of claim 50 wherein the means for post-processing to generate revised paths that correspond to each of the at least one most likely error event.

56. The signal detector of claim 50 wherein the means for post-processing further comprises means for correcting the most likely path based on the selected one of the revised paths.

57. The signal detector of claim 56 wherein the means for correcting to evaluate a parity condition of the most likely path and to correct the most likely path based on the selected one of the revised paths and the parity condition.

58. The signal detector of claim 57 wherein the parity condition has a parity violated state and a parity not violated state; and
wherein a correction threshold is adjusted based on the parity condition such that the correction threshold is set higher for the parity not violated state.

59. The signal detector of claim 50 wherein the at least one parameter is selected from the group consisting of target length, value of target taps, and quantity of target taps.

60. The signal detector of claim 50 wherein the means for detecting is selected from a group consisting of Viterbi detectors, PRML detectors, tree/trellis detectors, decision feedback detectors and hybrid detectors.

61. The signal detector of claim 60 included in a receiver to decode a communication signal from a storage device.

62. The signal detector of claim 50 wherein the means for post-processing is matched to the secondary target; and
wherein the primary target has a target length and the secondary target has a target length greater than the target length of the primary target.

63. A computer program stored on a computer readable media to perform a method for detecting data in an input signal, comprising:

equalizing the data to a primary target;
matching a Viterbi-like detector to the primary target;
using the Viterbi-like detector to detect data in the input signal to generate a most likely path corresponding to the data;
generating a most likely path corresponding to the data in the input signal;
matching a linear post-processor to one of the primary target and a secondary target wherein the secondary target has at least one parameter different than the primary target;
using the linear post-processor to determine at least one most likely error event in the most likely path;
generating revised paths based on the at least one most likely error event;
matching a media noise processor to the secondary target;
using the media noise processor to operate on the data;
computing path metrics corresponding to each of the revised paths as a function of a non-linear noise model; and
selecting one of the revised paths based on the path metrics.

64. The computer program of claim 63 further comprising communicating the data to the media noise processor from a finite impulse response (FIR) filter.

65. The computer program of claim 63 further comprising communicating the data to the media noise processor from an analog-to-digital converter.

66. The computer program of claim 63 wherein the primary target has a target length and the secondary target has a target length that is greater than the target length of the primary target.

67. The computer program of claim 63 wherein the operating on the data further comprises estimating an equalized channel response.

68. The computer program of claim 67 wherein the estimating further includes estimating non-linear parameters.

69. The computer program of claim 68 wherein the non-linear parameters are selected from a group consisting of mean shifts, residual noise variance, and noise whitening filtering (NWF).

70. The computer program of claim 67 wherein the estimating further includes initializing a secondary target response with a primary target response, and adapting the secondary target.

71. The computer program of claim 70 wherein the operating on the data further comprises determining a linear error as a function of convolving the primary target response with secondary target taps of the secondary target response.

72. The computer program of claim 63 wherein the linear post-processor is matched to the secondary target.

73. The computer program of claim 63 wherein the computing the metrics further includes generating revised paths that correspond to each of the at least one most likely error event.

74. The computer program of claim 63 further comprising correcting the most likely path based on the selected one of the revised paths.

75. The computer program of claim 74 wherein the correcting further includes evaluating a parity condition of the most likely path and correcting the most likely path based on the selected one of the revised paths and the parity condition.

76. The computer program of claim 75 wherein the parity condition has a parity violated state and a parity not violated state; and adjusting a correction threshold based on the parity condition such that the correction threshold is set higher for the parity not violated state.

77. The computer program of claim 76 wherein the correcting further includes evaluating a parity condition of the most likely path; and correcting the most likely path based on the selected one of the revised paths and the parity condition.

78. The computer program of claim 77 wherein the parity condition has a parity violated state and a parity not violated state; and adjusting a correction threshold based on the parity condition such that the correction threshold is set higher for the parity not violated state.

79. The computer program of claim 63 wherein the at least one parameter is selected from a group consisting of target length, value of target taps, and quantity of target taps.

80. The computer program of claim 63 wherein the Viterbi-like detector is selected from a group consisting of Viterbi detectors, PRML detectors, tree/trellis detectors, decision feedback detectors and hybrid detectors.

81. The computer program of claim 63 included in a receiver to decode a communication signal from a storage device.

82. The computer program of claim 63 wherein the non-linear noise model is described by the following equation:

$$BM = \ln(\sigma_t^2(x(D))) + \left(\sum_{k=0}^{L} \hat{f}_k(x(D))n_{t-k}\right)^2$$

where BM is the non-linear branch metric, L is memory length, $$\hat{f}_0 = \frac{1}{\sigma(x(D))}, \hat{f}_1 = -f_1 \cdot \frac{1}{\sigma(x(D))}, \ldots \hat{f}_3 = -f_3 \cdot \frac{1}{\sigma(x(D))},$$

represents the input bits to a channel, and $$n_t(x(D)) = \sum_{k=1}^{L} f_k(x(D))n_{t-k} + \sigma_t(x(D))N(0, 1).$$

83. A computer program stored on a computer readable media to perform a method for detecting data in an input signal, comprising:

equalizing the data to a primary target;
matching a Viterbi-like detector to the primary target;
using the Viterbi-like detector to detect data in the input signal;
generating a most likely path corresponding to the data in the input signal;
estimating a secondary target, the secondary target having at least one parameter different than the primary target;
matching a linear post-processor to one of the primary target and the secondary target;
using the linear post-processor to operate on the data and determine at least one most likely error event in the most likely path;
generating revised paths based on the at least one most likely error event;
computing path metrics corresponding to each of the revised paths as a function of the most likely path and the linear response; and
selecting one of the revised paths based on the path metrics.

84. The computer program of claim 83 wherein the using the linear post-processor further includes receiving the data from a finite impulse response (FIR) filter.

85. The computer program of claim 83 wherein the using the linear post-processor further includes receiving the data from an analog-to-digital converter.

86. The computer program of claim 83 wherein the estimating further includes initializing and aligning a secondary target response with a primary target response of the Viterbi-like detector; and adapting the secondary target based on the aligning.

87. The computer program of claim 86 wherein the using the linear post-processor further comprises convolving an output of the Viterbi-like detector with secondary target taps of the secondary target response to determine a linear error.

88. The computer program of claim 83 wherein the using the linear post-processor further includes generating revised paths that correspond to each of the at least one most likely error event.

89. The computer program of claim 83 wherein the using the linear post-processor further comprises correcting the most likely path based on the selected one of the revised paths.

90. The computer program of claim 83 wherein the at least one parameter is selected from a group consisting of target length, value of the target taps, quantity of target taps.

91. The computer program of claim 83 wherein the Viterbi-like detector is selected from a group consisting of Viterbi detectors, PRML detectors, tree/trellis detectors, decision feedback detectors and hybrid detectors.

92. The computer program of claim 91 included in a receiver to decode a communication signal from a storage device.

93. The computer program of claim 83 wherein the linear post-processor is matched to the secondary target; and wherein the primary target has a target length and the secondary target has a target length that is greater than the target length of the primary target.

94. A method for detecting data in an input signal, comprising:

equalizing the data to a primary target;
matching a Viterbi-like detector to the primary target;
using the Viterbi-like detector to detect data in the input signal to generate a most likely path corresponding to the data;
generating a most likely path corresponding to the data in the input signal;
matching a linear post-processor to one of the primary target and a secondary target wherein the secondary target has at least one parameter different than the primary target;
using the linear post-processor to determine at least one most likely error event in the most likely path;
generating revised paths based on the at least one most likely error event;
matching a media noise processor to the secondary target;
using the media noise processor to operate on the data;
computing path metrics corresponding to each of the revised paths as a function of a non-linear noise model; and
selecting one of the revised paths based on the path metrics.

95. The method of claim 94 further comprising communicating the data to the media noise processor from a finite impulse response (FIR) filter.

96. The method of claim 94 further comprising communicating the data to the media noise processor from an analog-to-digital converter.

97. The method of claim 94 wherein the primary target has a target length and the secondary target has a target length that is greater than the target length of the primary target.

98. The method of claim 94 wherein the operating on the data further comprises estimating an equalized channel response.

99. The method of claim 98 wherein the estimating further includes estimating non-linear parameters.

100. The method of claim 99 wherein the non-linear parameters are selected from a group consisting of mean shifts, residual noise variance, and noise whitening filtering (NWF).

101. The method of claim 98 wherein the estimating further includes initializing a secondary target response with a primary target response, and adapting the secondary target.

102. The method of claim 101 wherein the operating on the data further comprises determining a linear error as a function of convolving the primary target response with secondary target taps of the secondary target response.

103. The method of claim 94 wherein the linear post-processor is matched to the secondary target.

104. The method of claim 94 wherein the computing the metrics further includes generating revised paths that correspond to each of the at least one most likely error event.

105. The method of claim 94 further comprising correcting the most likely path based on the selected one of the revised paths.

106. The method of claim 105 wherein the correcting further includes evaluating a parity condition of the most likely path and correcting the most likely path based on the selected one of the revised paths and the parity condition.

107. The method of claim 106 wherein the parity condition has a parity violated state and a parity not violated state; and
adjusting a correction threshold based on the parity condition such that the correction threshold is set higher for the parity not violated state.

108. The method of claim 107 wherein the correcting further includes evaluating a parity condition of the most likely path; and
correcting the most likely path based on the selected one of the revised paths and the parity condition.

109. The method of claim 108 wherein the parity condition has a parity violated state and a parity not violated state; and
adjusting a correction threshold based on the parity condition such that the correction threshold is set higher for the parity not violated state.

110. The method of claim 94 wherein the at least one parameter is selected from a group consisting of target length, value of target taps, and quantity of target taps.

111. The method of claim 94 wherein the Viterbi-like detector is selected from a group consisting of Viterbi detectors, PRML detectors, tree/trellis detectors, decision feedback detectors and hybrid detectors.

112. The method of claim 94 included in a receiver to decode a communication signal from a storage device.

113. The method of claim 94 wherein the non-linear noise model is described by the following equation:

$$BM = \ln(\sigma_t^2(x(D))) + \left( \sum_{k=0}^{L} \hat{f}_k(x(D)) n_{t-k} \right)^2$$

where BM is the non-linear branch metric, L is memory length, $$\hat{f}_0 = \frac{1}{\sigma(x(D))}, \hat{f}_1 = -f_1 \cdot \frac{1}{\sigma(x(D))}, \ldots \hat{f}_3 = -f_3 \cdot \frac{1}{\sigma(x(D))},$$

represents the input bits to a channel, and $$n_t(x(D)) = \sum_{k=1}^{L} f_k(x(D)) n_{t-k} + \sigma_t(x(D)) N(0, 1).$$

114. A method for detecting data in an input signal, comprising:
equalizing the data to a primary target;
matching a Viterbi-like detector to the primary target;
using the Viterbi-like detector to detect data in the input signal;
generating a most likely path corresponding to the data in the input signal;
estimating a secondary target having at least one parameter different than the primary target;
matching a linear post-processor to one of the primary target and a secondary target;
using the linear post-processor to operate on the data and determine at least one most likely error event in the most likely path;
generating revised paths based on the at least one most likely error event;
computing path metrics corresponding to each of the revised paths as a function of the most likely path and the linear response; and
selecting one of the revised paths based on the path metrics.

115. The method of claim 114 wherein the using the linear post-processor further includes receiving the data from a finite impulse response (FIR) filter.

116. The method of claim 114 wherein the using the linear post-processor further includes receiving the data from an analog-to-digital converter.

117. The method of claim 114 wherein the estimating further includes initializing and aligning a secondary target response with a primary target response of the Viterbi-like detector; and
adapting the secondary target based on the aligning.

118. The method of claim 117 wherein the using the linear post-processor further comprises convolving an output of the Viterbi-like detector with secondary target taps of the secondary target response to determine a linear error.

119. The method of claim 114 wherein the using the linear post-processor further includes generating revised paths that correspond to each of the at least one most likely error event.

120. The method of claim 114 wherein the using the linear post-processor further comprises correcting the most likely path based on the selected one of the revised paths.

121. The method of claim 114 wherein the at least one parameter is selected from a group consisting of target length, value of the target taps, quantity of target taps.

122. The method of claim 114 wherein the Viterbi-like detector is selected from a group consisting of Viterbi detectors, PRML detectors, tree/trellis detectors, decision feedback detectors and hybrid detectors.

123. The method of claim 122 included in a receiver to decode a communication signal from a storage device.

124. The method of claim 114 wherein the linear post-processor is matched to the secondary target; and wherein the primary target has a target length and the secondary target has a target length that is greater than the target length of the primary target.

* * * * *

UNITED STATES PATENT AND TRADEMARK OFFICE
CERTIFICATE OF CORRECTION

PATENT NO. : 7,155,660 B1 Page 1 of 1
APPLICATION NO. : 10/698660
DATED : December 26, 2006
INVENTOR(S) : Gregory Burd It is certified that error appears in the above-identified patent and that said Letters Patent is hereby corrected as shown below:

Column 6, Line 54: Delete the second "the"
Column 6, Line 54: Delete "ouput" and insert --output--
Column 8, Line 24: Delete "select" after "preferably"
Column 8, Line 55: Insert a--.-- at the end of the sentence
Column 12, Line 59: Insert --x(D)-- before "represents"
Column 15, Line 42: Insert --x(D)-- before "represents"
Column 18, Line 15: Insert --x(D)-- before "represents"

Signed and Sealed this

Fourth Day of March, 2008

JON W. DUDAS
*Director of the United States Patent and Trademark Office*